3,790,607
CARBONYLATION OF FLUOROCARBON IODIDES
Bernard Murray Lichstein, Elizabeth, N.J., assignor to Allied Chemical Corporation, New York, N.Y.
No Drawing. Filed May 20, 1971, Ser. No. 145,564
Int. Cl. C07c 51/00, 51/54, 67/00
U.S. Cl. 260—408          14 Claims

ABSTRACT OF THE DISCLOSURE

This invention provides a direct method for carbonylation of fluorocarbon compounds without loss of fluorine substituents. The method comprises reacting a fluorocarbon iodide with carbon monoxide and an active-hydrogen containing compound, such as methanol, in the presence of a metal carbonyl catalyst.

---

This invention relates to the carbonylation of fluorinated compounds. More particularly, it is directed to the preparation of fluorinated compounds containing a carbonyl group by a process which permits direct reaction of carbon monoxide, a fluorocarbon iodide and an active-hydrogen containing substance.

Fluorinated acids, esters, ketones, etc. are valuable chemicals which have particular value as intermediates in the fundamental synthesis of other fluorochemicals such as alcohols, amides, amines, nitriles and polymers derived from these materials such as polyesters and polyamides. The derivatives as well as the intermediates themselves can be used in established applications as solvents, oil-repellents and other uses well known in the art.

Fluorocarbons have heretofore been carbonylated via various procedures involving numerous steps including oxidation procedures employing strong oxidants such as potassium permanganate, sulfur trioxide, chlorosulfonic acid, dichromate, etc. Such procedures, though successful in introducing a carbonyl group in the carbon chain, often involve concomitant loss of fluorine values where carbonylation occurs by conversion of the terminal carbon containing-fluorine substituents to the carbonyl group which, of course, is undesirable but often unavoidable. In addition to the undesirable loss of fluorine the strong oxidants employed in such procedures also are highly corrosive to reaction equipment.

It is an object of this invention to provide a simple and direct method for introducing the carbonyl function in a fluorocarbon chain.

It is a further object of the invention to provide a process for the preparation of carbonylated fluorocarbons in which the carbonyl function is added to the fluorocarbon chain without sacrificing the fluorine substituents of the terminal carbon atoms.

Other objects of the invention will be apparent from the following detailed description thereof.

In accordance with the invention, carbonylated fluorocarbons are produced by a process which comprises reaction of a fluorocarbon iodide with carbon monoxide and an active-hydrogen containing compound in the presence of a metal carbonyl catalyst.

The products of the invention may be characterized by the formula

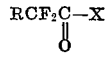

wherein R is as hereinafter defined and X is the residue of an active-hydrogen containing compound. Thus X may be the residue of an aliphatic alcohol, thiol, carboxylic acid, water, etc. resulting from the removal of HI from the reactants according to the following illustrative equations:

(1) Preparation of esters

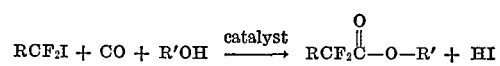

(2) Preparation of acids

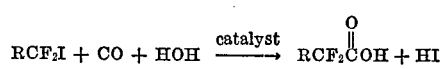

(3) Preparation of anhydrides

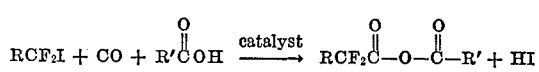

(4) Preparation of thioesters

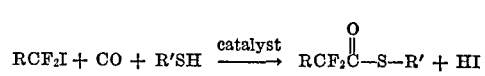

From the illustrative equations, it can be seen that carbonylation is effected directly with carbon monoxide, the carbonyl functional group being joined to the fluorocarbon radical and the residue of an active-hydrogen containing compound via removal of hydrogen iodide from the reactants. The main product received will thus be either an ester, acid, anhydride, thioester, etc., depending upon the active-hydrogen containing compound employed. A smaller amount of the corresponding ketone is also prepared and a major by-product is the fluorocarbon $RCF_2H$.

The process is performed at super-atmospheric pressure which may vary as the reaction temperature and volume varies. Pressure at the reaction temperature is determined by the pressure, volume and temperature relationships for carbon monoxide and, in general, a minimum pressure of 1000 p.s.i.g. is recommended with pressures of about 2000 to 3000 p.s.i.g. being especially preferred under the temperature conditions employed. Such temperatures may be as low as 100° C. with the preferred range being about 150° C. to 200° C. Temperatures higher than 200° C. will result in increased by-product formation and thermal degradation of the reaction products and are thus to be avoided.

Preferably, stoichiometric proportions of fluorocarbon iodide and active-hydrogen containing compound are employed with an excess of carbon monoxide together with catalytic amounts of metal carbonyl catalyst.

The fluorocarbon iodides suitable for use in the process may be any fluorine-containing compound of the formula $RCF_2I$ wherein R can be a straight or branched chain, substituted or unsubstituted aliphatic, aromatic, cycloaliphatic or heterocyclic radical. Thus $RCF_2I$ may represent fluorocarbon iodides wherein R may be alkyl, preferably containing 1 to 20 carbon atoms, including methyl, ethyl, propyl, isopropyl, neopentyl, dodecyl, etc.; perfluoroalkyl, preferably containing 3 to 17 carbon atoms, including perfluoroisopropyl, pentadecafluoroheptyl, perfluoroundecyl, etc.; alkoxyalkyl, preferably containing 1 to 20 carbon atoms, including isopropoxyethyl, ethoxybutyl, methoxy methyl, isopropoxybutyl, etc.; alkoxy, preferably containing 1 to 20 carbon atoms, including methoxy, ethoxy, butoxy, etc.; cycloalkyl, preferably containing 4 to 10 carbon atoms including cyclopentyl, cyclohexyl, cyclobutyl, etc.; aryl, preferably containing 6 to 12 carbon atoms, including phenyl, naphthyl, biphenyl, etc.; aralkyl, preferably containing 7 to 20 carbon atoms, including benzyl, phenethyl, etc.; alkaryl, preferably containing 7 to 20 carbon atoms, including tolyl, cumyl, xylyl, etc.; heterocyclic, containing 4 to 10 atoms, the hetero members of which are O, S or N including pyridyl, quinolyl, furyl, thiazolyl, etc.; and fluoroisoalkoxyalkyl. The latter class of fluoroiodides are preferably characterized by those compounds wherein R is a radical of the formula:

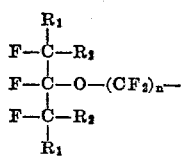

wherein $R_1$ and $R_2$ are fluorine or fluoroalkyl groups, or, when taken together, are fluoroalkylene groups forming a cycloaliphatic structure, which $R_1$ and $R_2$ groups may each have from 1 to 9 carbon atoms, provided that not more than three of the $R_1$ and $R_2$ groups may be fluoroalkyl groups; and $n$ is an integer from 1 to 20.

In the preferred embodiments of the invention, the moiety R of the fluorocarbon iodide reactant is a perfluoroalkyl radical containing about 3 to 17 carbon atoms or a fluoroisoalkoxyalkyl radical of formula illustrated above wherein $n$ is 1 to 6. Additionally, in the preferred fluorinated isoalkoxyalkyl radical, $R_1$ and $R_2$ are independently fluorine or perfluoroalkyl groups containing 1 or 2 carbon atoms.

Active-hydrogen containing compounds suitable for use in the present invention include water, aliphatic alcohols, aliphatic thiols, aliphatic carboxylic acids, etc.; which may be mono- or difunctional. Preferred compounds in addition to water are those which contain from 1 to 18 carbon atoms, preferably 1 to 6 carbon atoms, and include alcohols, such as methanol, ethanol, n-butanol, pentanol, 6-undecanol, octanol, cetyl alcohol, ethylene glycol, etc.; acids, such as acetic, propionic, butyric, caproic, palmitic, dodecanoic, etc.; and thiols corresponding to the alcohols mentioned above.

The preferred active-hydrogen containing compounds are lower aliphatic alcohols of which methanol is especially preferred.

The reaction is conducted in the presence of catalytic amounts of carbonylation catalysts which are metal carbonyl complexes. Such complexes are well known in the art and comprise metals coordinated to electron-donating ligands through which coordination the metal achieves the electron configuration of the next higher inert gas. Such catalysts suitable for use in the present invention include not only the metal carbonyl complexes per se but also those metals or metal complexes capable of forming a carbonyl complex in situ. Certain metal carbonyls which form stable complexes with the fluoroiodide, for example, iron pentacarbonyl which forms the complex $RFe(CO)_4I$ in which the R—Fe bond is quite strong, as well as nickel tetracarbonyl which shows no catalytic activity herein are not suitable. Suitable catalysts include metal carbonyls in which the metal is a member of Groups V–B, VI–B and VII–B of the Periodic Table of Elements as well as cobalt, ruthenium and rhodium. Such compounds include simple metal carbonyls of Mo, Co, Cr, Rh, W, V, Re, Ru and Mn as well as anionic and cationic complex carbonyls of these metals. Complexes in which the metal carbonyl includes organic ligands such as triphenyl phosphine, cyclopentadiene, butadiene, etc. are also effective. Various of the above-mentioned metals and salts thereof which form carbonyl complexes in-situ may be employed such as ruthenium or cobalt powder or chromium chloride in the presence of a reducing agent such as zinc. Illustrative of such catalysts are:

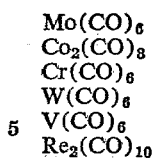
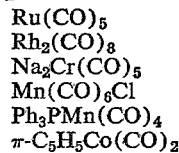

The simple metal carbonyls, particularly $Co_2(CO)_8$, $Mo(CO)_6$, $W(CO)_6$ and $Cr(CO)_6$ are preferred catalysts herein. The molar ratio of catalyst to fluorocarbon iodide preferably ranges from about 0.01:1 to about 1:1, more preferably from about 0.05:1 to about 0.5:1.

The carbonylated fluorinated esters, acids, anhydrides, etc. prepared by the instant process can be separated from the other compounds present in the reaction mixture by fractional distillation employing procedures well known in the art.

The following examples are given to further illustrate the invention.

EXAMPLE 1

A mixture of 31.1 grams (0.076 mol) of perfluoroisopropoxyethyl iodide, 0.4 gram (0.08 mol) methanol and 5.0 grams of $Co_2(CO)_8$ were placed in an autoclave and brought to a pressure of 3150 p.s.i.g. with carbon monoxide. The mixture was stirred, heated to 190° C. and maintained at about 180° to 202° C. for 4.5 hours after which the autoclave contents were cooled to room temperature and vented of carbon monoxide. Distillation of the liquid contents of the autoclave yielded a fraction boiling at 98–102° C. in addition to unreacted fluorocarbon iodide, the compound $(CF_3)_2CFOCF_2CF_2H$ and acetone. Gas chromatographic analysis was used to separate pure material for infrared analysis and nuclear magnetic resonance analysis which indicated the product to be the ester $(CF_3)_2CFOCF_2CF_2COOCH_3$ with traces of the ketone $[(CF_3)_2CFOCF_2CF_2]_2CO$.

EXAMPLE 2

The procedure of Example 1 was repeated except the fluorocarbon iodide was perfluoroisopropoxybutyl iodide. Distillation yielded a material distilling at 26–27° C. (0.5–0.7 mm. pressure) which was purified to 93% purity by gas chromatography. Infrared and nuclear magnetic resonance analysis were in excellent agreement with the structural requirements for the ester $$(CF_3)_2CFO(CF_2)_3CF_2COOCH_3$$

Analysis for $(CF_3)_2CFO(CF_2)_3CF_2COOCH_3$.—Calculated (percent): C, 24.33; H, 0.68; F, 64.2. Found (percent): C, 23.43; H, 0.94; F, 66.5.

EXAMPLE 3

Example 1 was repeated except the fluorocarbon iodide and catalyst were varied and the products recovered were as indicated in Table I below:

TABLE I

| Fluorocarbon iodide | Catalyst | Active-hydrogen compound | Temperature, °C. | Time, hours | Product |
|---|---|---|---|---|---|
| $(CF_3)_2CFO(CF_2)_3CF_2I$ | $Co_2(CO)_8$ | $CH_3OH$ | 250 | 5 | $(CF_3)_2CFO(CF_2)_3CF_2COOCH_3$ |
| $(CF_3)_2CFO(CF_2)_3CF_2I$ | $Co_2(CO)_8$ | $CH_3OH$ | 200 | 5 | $(CF_3)_2CFO(CF_2)_3CF_2COOCH_3$ |
| $(CF_3)_2CFO(CF_2)_3CF_2I$ | $Mo(CO)_6$ | $CH_3OH$ | 200 | 5.0 | $(CF_3)_2CFO(CF_2)_3CF_2COOCH_3$ |
| $(CF_3)_2CFO(CF_2)_3CF_2I$ | $W(CO)_6$ | $CH_3OH$ | 200 | 5.5 | $(CF_3)_2CFO(CF_2)_3CF_2COOCH_3$ |
| $CF_3(CF_2)_6CF_2I$ | $Cr(CO)_6$ | $CH_3OH$ | 200 | 5.0 | $CF_3(CF_2)_6CF_2COOCH_3$ |
| $(CF_3)_2CFO(CF_2)_5CF_2I$ | $Co_2(CO)_8$ | $CH_3OH$ | 200 | 4 | $(CF_3)_2CFO(CF_2)_5CF_2COOCH_3$ |

I claim:

1. A method for the carbonylation of fluorocarbon compounds which comprises reacting a fluorocarbon iodide with carbon monoxide and an active-hydrogen containing compound in the presence of a metal carbonyl catalyst of the group $Co_2(CO)_8$, $Mo(CO)_6$, $W(CO)_6$ and $Cr(CO)_6$ at a temperature within the range of about 100° C. to 200° C. and a pressure of at least 1000 p.s.i.g., wherein said fluorocarbon iodide is of the formula $RCF_2I$ wherein R is a radical selected from the group of alkyl containing 1 to 20 carbon atoms; perfluoroalkyl containing 3 to 17 carbon atoms; alkoxyalkyl containing 1 to 20 carbon atoms; alkoxy containing 1 to 20 carbon atoms; cycloalkyl containing 4 to 10 carbon atoms; aryl containing 6 to 12 carbon atoms; heterocyclic containing 4 to 10 atoms, the hetero members being nitrogen, oxygen or sulfur; and fluoroisoalkoxyalkyl radicals of the formula:

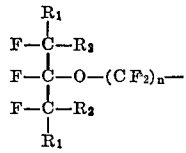

wherein $R_1$ and $R_2$ are fluorine or fluoroalkyl groups, or, when taken together are fluoroalkylene groups forming a cycloaliphatic ring, which $R^1$ and $R^2$ groups may each have from 1 to 9 carbon atoms, provided that not more than three of the $R_1$ and $R_2$ groups may be fluoroalkyl groups; and $n$ is an integer from 1 to 20 and wherein said active-hydrogen containing compound is selected from the group of water, aliphatic alcohols, aliphatic thiols and aliphatic monocarboxylic acids, the aliphatic groups containing 1 to 18 carbon atoms.

2. A method as claimed in claim 1 where R is a fluoroisoalkoxyalkyl radical and $R_1$ and $R_2$ are fluorine, and $n$ is from 1 to 6.

3. A method as claimed in claim 1 wherein R is perfluoroalkyl containing 3 to 17 carbon atoms.

4. A method as claimed in claim 1 wherein said active-hydrogen compound is an aliphatic alcohol.

5. A method as claimed in claim 4 wherein said alcohol is methanol.

6. A method as claimed in claim 1 wherein said active-hydrogen containing compound is water.

7. A method as claimed in claim 1 wherein said active-hydrogen containing compound is an aliphatic monocarboxylic acid.

8. A method as claimed in claim 1 wherein said active-hydrogen containing compound is an aliphatic thiol.

9. A method as claimed in claim 1 wherein said temperature is about 150° C. to 200° C. and said pressure is in the range of about 2000 to 3000 p.s.i.g.

10. A method as claimed in claim 9 wherein said fluorocarbon iodide is $CF_3(CF_2)_6CF_2I$, said active-hydrogen containing compound is methanol and said catalyst is $Cr(CO)_6$.

11. A method as claimed in claim 9 wherein said fluorocarbon iodide is $(CF_3)_2CFO(CF_2)_3CF_2I$, said active-hydrogen containing compound is methanol and said catalyst is $Co_2(CO)_8$.

12. A method as claimed in claim 9 wherein said fluorocarbon iodide is $(CF_3)_2CFO(CF_2)_2CF_2I$, said active-hydrogen compound is water and said catalyst is $Co_2(CO)_8$.

13. A method as claimed in claim 9 wherein said fluorocarbon iodide is $CF_3(CF_2)_6CF_2I$, said active-hydrogen compound is acetic acid and said catalyst is $Cr(CO)_6$.

14. A method as claimed in claim 9 wherein said fluorocarbon iodide is $(CF_3)_2CFO(CF_2)_5CF_2I$, said active-hydrogen compound is ethyl mercaptan and said catalyst is $Co_2(CO)_8$.

References Cited
UNITED STATES PATENTS 3,116,306  12/1963  Heck _____ 260—410.9
3,168,553  2/1965   Slaugh _____ 260—497

OTHER REFERENCES

Lovelace et al.: Aliphatic Fluorine Compounds, Reinhold Publishing Corp., New York (1958), pp. 32–33.

LEWIS GOTTS, Primary Examiner

D. G. RIVERS, Assistant Examiner

U.S. Cl. X.R.

260—287 R, 295 R, 302 R, 347.3, 468 R, 469, 476 R, 484 R, 487, 514 C, 515 A, 521 A, 535 H, 539, 546, 455 R